Sept. 11, 1956  J. L. TOMPKINS  2,762,157
FISHHOOK GUARD
Filed Aug. 3, 1955
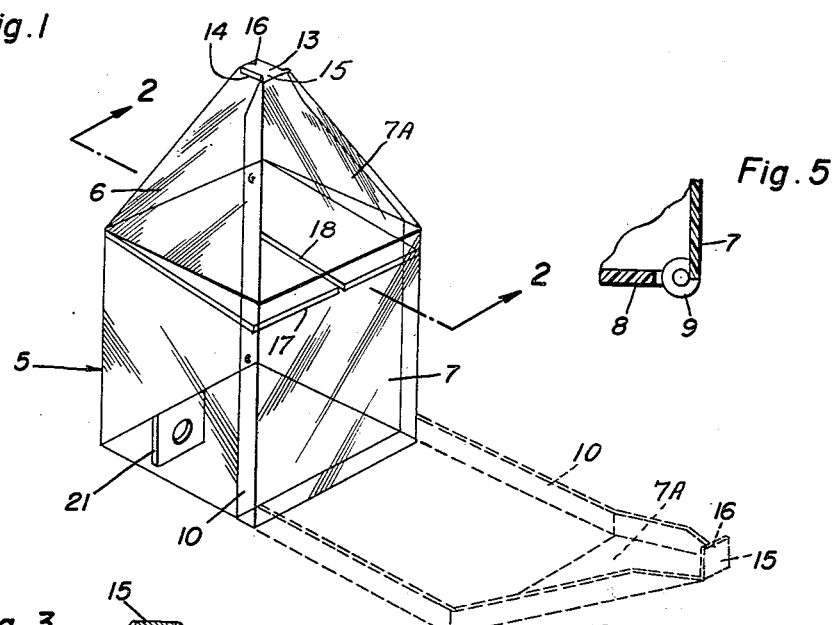
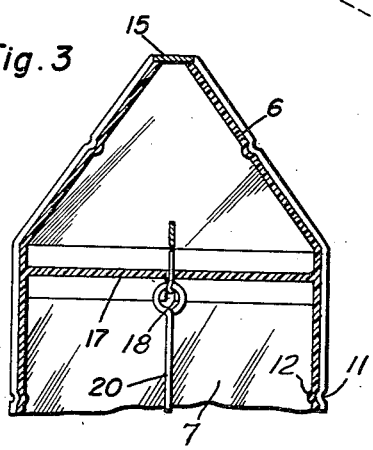
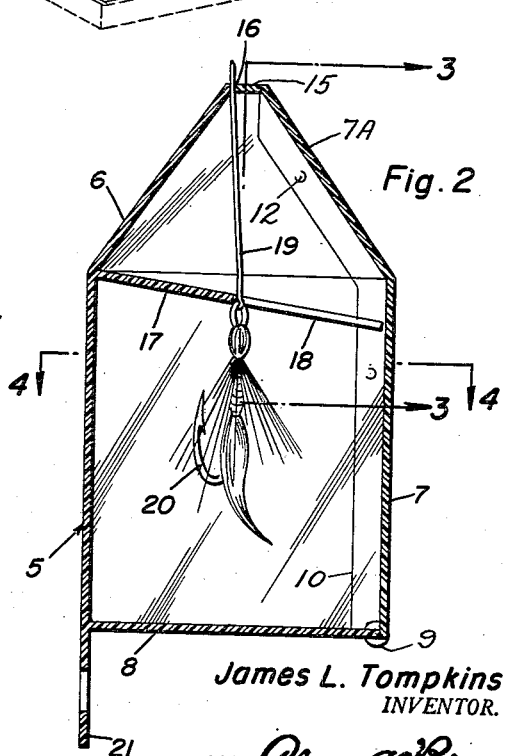
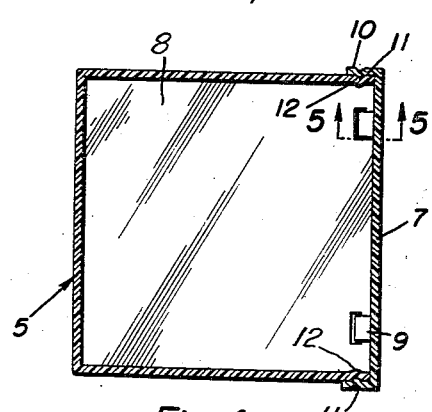
James L. Tompkins
INVENTOR.

United States Patent Office 2,762,157
Patented Sept. 11, 1956

2,762,157
FISHHOOK GUARD
James L. Tompkins, Bonner Springs, Kans.

Application August 3, 1955, Serial No. 526,112

4 Claims. (Cl. 43—57.5)

The present invention relates to new and useful improvements in guards for fishhooks, artificial lures and the like, for conveniently carrying the same without danger of having the hooks catch in the clothing of the person or with other objects while carrying a fishing line from place to place.

An important object of invention is to provide a container in which the fishhook or lure may be placed without detaching the latter from a fishing line.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of a fish hook holder;

Figure 2 is a vertical sectional view taken on the line 2—2 of Figure 1;

Figure 3 is a fragmentary vertical sectional view taken on a line 3—3 of Figure 2;

Figure 4 is a horizontal transverse sectional view taken on a line 4—4 of Figure 2; and Figure 5 is an enlarged fragmentary sectional view of the hinge structure for the door taken on a line 5—5 of Figure 4.

Referring now to the drawing in detail, wherein for the purpose of illustration, I have disclosed a preferred embodiment of my invention, the numeral 5 designates a box-like container which may be square or other suitable shape, and formed with a pyramidal-shaped top 6. The front of the container and the top 6 are open and provided with a door 7 which is hinged at its lower edge to the bottom 8 of the container by a conventional type of hinge structure 9 for swinging the door upwardly into a closed position at the front of the container and top 6. The upper portion of the door is of substantially triangular shape, as shown at 7-A, to form one side of the pyramidal top 6 when closed against the latter.

The side edges of the door 7, including the upper portion 7-A, are formed with rearwardly projecting flanges 10 which overlap the adjacent side edges of the container 5 and pyramidal top 6, respectively, and the flanges 10 are formed with catch means preferably comprising inwardly pressed knobs 11 adapted to enter and snap into recesses 12 in the side walls of the container.

The apex of the pyramidal top 6 is flattened, as shown at 13, to form a substantially square-shaped opening 14 and which is closed by a horizontal tongue 15 on the upper end portion of the door. The rear edge of the tongue 15 is formed with a notch or recess 16 and which is offset rearwardly from the vertical center line of the container for a purpose more fully hereinafter explained.

The container 5, pyramidal top 6 and door 7 are preferably constructed of transparent plastic or other suitable substantially rigid noncorrosive sheet material, and a panel 17 preferably of a similar material is integrally formed interiorly of the container at the rear junction thereof with the pyramidal top 6. The panel 17 is united with or otherwise suitably secured to the rear as well as the side walls of the container, and slopes downwardly toward the open front thereof and is formed in its front portion with a rearwardly extending slot 18 to a point substantially at the center of the panel.

In the operation of the device, when it is desired to place a fishhook or lure in the container, the door 7 is swung downwardly into an open position, as shown by dotted lines in Figure 1, and the fishing line 19, to which the hook 20 is attached, is placed in the slot 18 with the hook positioned below the panel and the fishing line is moved rearwardly in the slot to position the hook substantially at the center of the container. The fishing line is pulled taut to hold the hook 20 in a suspended position in the container, and the door 7 is closed to clamp the line in the notch 16 of tongue 15 at the upper end of the door. The forward slope of panel 17 prevents the hook 20 from sliding toward the front of the container, and the rearward offset position of the notch 16 further tends to maintain the line 19 at the rear end of slot 18, as shown in Figure 2.

With the fishing lure or hook 20 placed in the container in the manner indicated, the same may be safely carried without danger of the hook becoming entangled with clothing or other objects.

An apertured tongue or eye 21 is integrated with and projects downwardly below the bottom of the container, at the rear thereof, and through which a separate cord (not shown) may be inserted for tying to a fishing rod (not shown) to retain the container and fishing line in a convenient carrying position close to the rod.

Since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A fishhook guard comprising a container having an open front and an opening in its top, a door hinged to the lower portion of the container for closing the front and top thereof, and a panel supported in a sloping position in the upper portion of the container and having a slot therein extending rearwardly from the front edge of the panel and adapted to receive a fishing line in the slot, said fishing line having a fishhook attached thereto and engaged under the panel and said fishing line extending outwardly through the top of the container for suspending the container thereon.

2. The construction of claim 1 wherein said panel slopes downwardly toward the front of the container to slide the fishing line toward the rear portion of the slot when the container is suspended on said fishing line.

3. The construction of claim 1 and including a rearwardly projecting tongue on the door closing the opening in the top of the container.

4. The construction of claim 1 and including a rearwardly projecting tongue on the door closing the opening in the top of the container and said tongue having an opening positioned rearwardly of the vertical axis of the container and through which the fishing line passes to urge the latter toward the rear of the slot.

References Cited in the file of this patent

UNITED STATES PATENTS

| 2,095,048 | Aikens | Oct. 5, 1937 |
| 2,424,419 | Rosa | July 22, 1947 |
| 2,434,861 | Pachner | Jan. 20, 1948 |
| 2,723,484 | Nelson | Nov. 15, 1955 |

FOREIGN PATENTS

| 1,024,623 | France | Jan. 10, 1953 |